Patented June 2, 1925.

1,540,665

UNITED STATES PATENT OFFICE.

KARL THIESS, OF LINDLINGEN, NEAR HOECHST-ON-MAIN, GERMANY, ASSIGNOR TO FARBWERKE VORM. MEISTER LUCIUS & BRUNING, OF HOECHST-ON-MAIN, GERMANY, A CORPORATION OF GERMANY.

MONOAZO DYESTUFF.

No Drawing.     Application filed October 8, 1923.  Serial No. 667,410.

*To all whom it may concern:*

Be it known that I, KARL THIESS, a citizen of Germany, residing at Lindlingen, near Hoechst-on-Main, Germany, have invented certain new and useful Improvements in Monoazo Dyestuffs, of which the following is a specification.

In U. S. patent application Ser. No. 667,409 filed Oct. 8, 1923, I have set forth that by the action of diazotized m-aminobenzaldehyde and its substitution products and compounds capable of splitting off m-aminobenzaldehyde upon pyrazolones valuable, fast yellow acid wool dyestuffs are obtained.

I have furthermore found that by coupling the above-mentioned diazo compounds with acidylamino-alkylamino- and arylamino-naphtholmono- and poly-sulfonic acids and with their derivatives, new acid wool dyestuffs are obtained. The new dyestuffs dye wool yellow-red, red, bluish-red, violet-brown to brown fast tints evenly and possess besides a very great fastness to light and alkali and a surprisingly great fastness to washing and water. These dyestuffs which possess good equalizing properties are very suitable for dyeings on the animal fibre in an acid bath and for printings on wool.

The dyestuffs are represented by the following general formula:

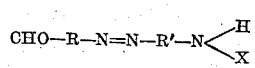

in which R stands for a benzene residue which may be substituted, R' stands for a residue of one of the naphtholmono- and poly-sulfonic acids, and X may be one of the residues, acidyl, aryl and alkyl. The dyestuffs form differently colored powders soluble in hot water and in concentrated sulfuric acid with a characteristic coloration and exhibit reactions characteristic of the aldehyde group.

The following examples illustrate my invention:

(1) 12, 1 kg. of m-aminobenzaldehyde are diazotized in the known manner and coupled as usual with a soda-alkaline solution of 31, 5 kg. 2-phenylamino-8-naphthol-6-sulfonic acid. The dyestuff which is salted out equalizes well and dyes wool in an acid bath vivid reddish-brown fast tints. It is also well fit for wool printing. The dyestuff has probably the formula:

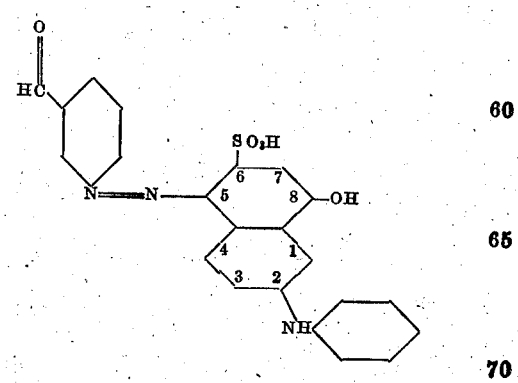

(2) The substitution of the 2-phenylamino-8-naphthol-6-sulfonic acid by 33 kg. of 2-o-tolylamino-8-naphthol-6-sulfonic acid yields a dyestuff which gives a tint of a somewhat more reddish hue.

(3) If in Example (1) the m-aminobenzaldehyde is replaced by .15, 4 kg. of 4-chloro-5-aminobenzaldehyde, the dyestuffs obtained give fast dark-brown tints.

(4) If one works according to Example (1) and replaces the 2-phenylamino-8-naphthol-6-sulfonic acid by 31.5 kg of 2-phenylamino-5-naphthol-7-sulfonic acid, the resulting dyestuff dyes wool in an acid bath fast orange red tints.

(5) 361 parts by weight of 1-acetylamino-8-naphthol-3.6-disulfonic acid are combined as usual in the soda alkaline solution with 121 parts by weight of m-aminobenzaldehyde. The formation of the dyestuff is completed by a one hour's stirring and the dyestuff thus obtained is isolated by salting out. It dyes wool in an acid bath pure red tints of a blue hue of a very good fastness to washing and fulling and of an excellent fastness to light.

The benzoyl-H-acid yields a dyestuff giving somewhat bluer tints.

(6) The replacing of the 1-acetylamino-8-naphthol-3.6-disulfonic acid by the 1-acetylamino-8-naphthol-4.6-disulfonic acid leads to an equally fast dyestuff giving pure red tints.

(7) If in Example 5 the acetyl-H-acid is replaced by the 2-acetylamino-5-naphthol-7-sulfonic acid, a dyestuff is obtained which gives on wool in an acid bath yellow red tints of a good fastness to water washing, fulling and alkali. The fastness to light is particularly good.

(8) If one works according to Example (1) and replaces the 2-phenylamino-8-naphthol-6-sulfonic acid by 26.7 kg of 2-ethylamino-8-naphthol-6-sulfonic acid a dyestuff is obtained dyeing in an acid bath fast dark orange-brown tints.

(9) If in Example (5) the acetyl-H-acid is replaced by the corresponding molecular quantity by weight of the 1-ethylamino-8-naphthol-3.5-disulfonic acid a dyestuff is obtained which dyes fast dark red tints.

(10) 121 parts by weight of m-aminobenzaldehyde are diazotized as usual and combined with a soda alkaline solution of 400 parts by weight of p-aminobenzoyl-2-amino-5-naphthol-7-sulfonic acid (90 per cent) at a temperature of 0–5°. The formation of the dyestuff at once sets in and is completed by a short stirring. The dyestuff which partly is still dissolved may be salted out by common salt. It dyes wool in an acid bath clear yellow red tints of an excellent fastness to washing, fulling and to water. By an after-treatment with potassium chromate there is obtained a fast orange red. The dyestuff has probably the formula:

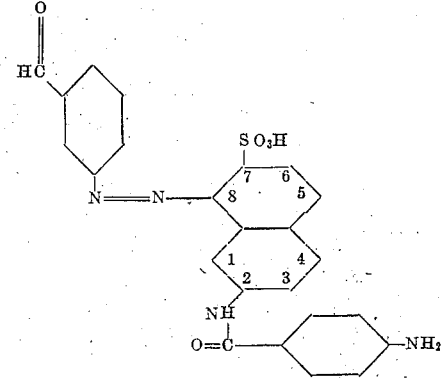

Instead of m-aminobenzaldehyde there may be used as well its substitution products and compounds splitting off m-aminobenzaldehyde for instance.

Instead of the ethylaminonaphtholsulfonic acids described in the examples there may be used as well the corresponding methylamino- and propylaminonaphtholsulfonic acids.

Having now described my invention what I claim is:

As new articles of manufacture, monoazo dyestuffs obtainable by coupling the diazo compounds of m-aminobenzaldehyde and its substitution products and compounds capable of splitting off m-aminobenzaldehyde with the amino-naphthol-mono- and polysulfonic acids in which one hydrogen of the amino group may be replaced by one of the residues, alkyl, aryl and acidyl, said dyestuffs having the general formula

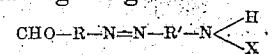

in which R stands for a benzene residue which may be substituted, R' stands for a residue of one of the naphthol mono- and poly-sulfonic acids and X may be one of the residues acidyl, aryl and alkyl, said dyestuffs dyeing wool yellowish red, bluish red, and violet red to brown fast tints and forming differently colored powders soluble in hot water and in concentrated sulfuric acid with a characteristic coloration and exhibiting the reaction characteristics of the aldehyde group.

In testimony whereof, I affix my signature.

KARL THIESS.

Witnesses:
M. W. ALTAFFER,
C. C. L. B. WYLES.

Certificate of Correction.

It is hereby certified that in Letters Patent No. 1,540,665, granted June 2, 1925, upon the application of Karl Thiess, of Lindlingen, near Hoechst-on-Main, Germany, for an improvement in "Monoazo Dyestuffs," an error appears in the printed specification requiring correction as follows: Page 2, strike out lines 59 to 73, comprising the formula, and insert the following as the formula:

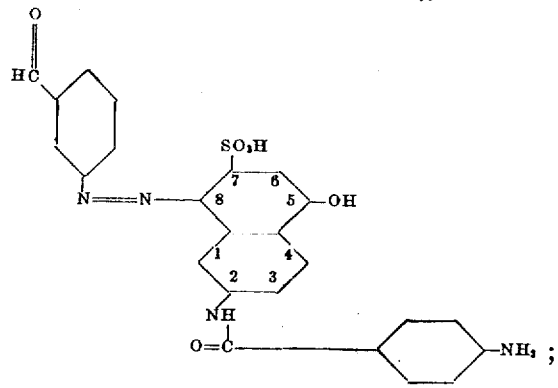

and that the said Letters Patent should be read with this correction therein that the same may conform to the record of the case in the Patent Office.

Signed and sealed this 7th day of July, A. D. 1925.

[SEAL.]

WM. A. KINNAN,
*Acting Commissioner of Patents.*